W. Z. WILLIS.
AUTOMATIC WAGON BRAKE.
APPLICATION FILED JAN. 8, 1916.
1,224,587.
Patented May 1, 1917.
2 SHEETS—SHEET 1.
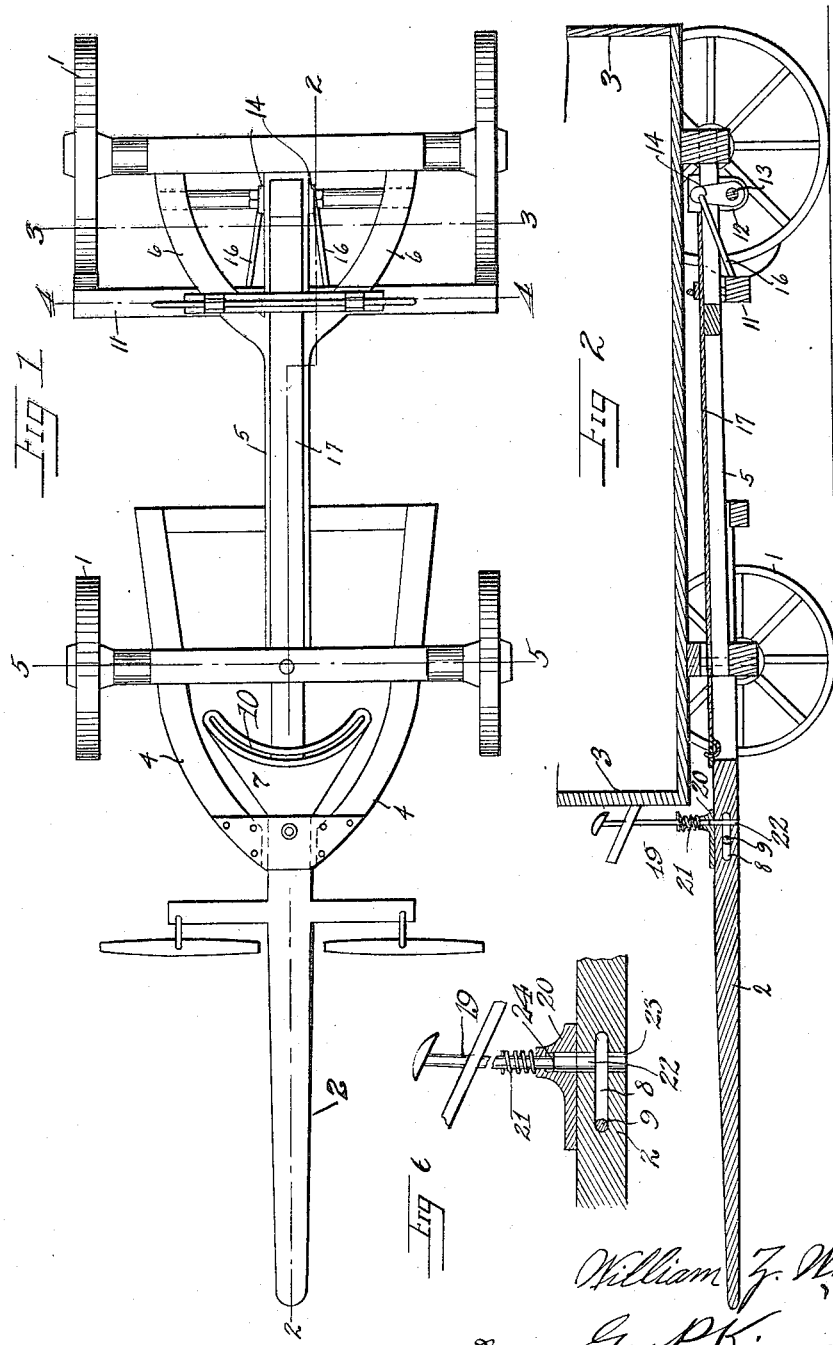
Inventor
William Z. Willis
By Geo. P. Kimmel.
Attorney

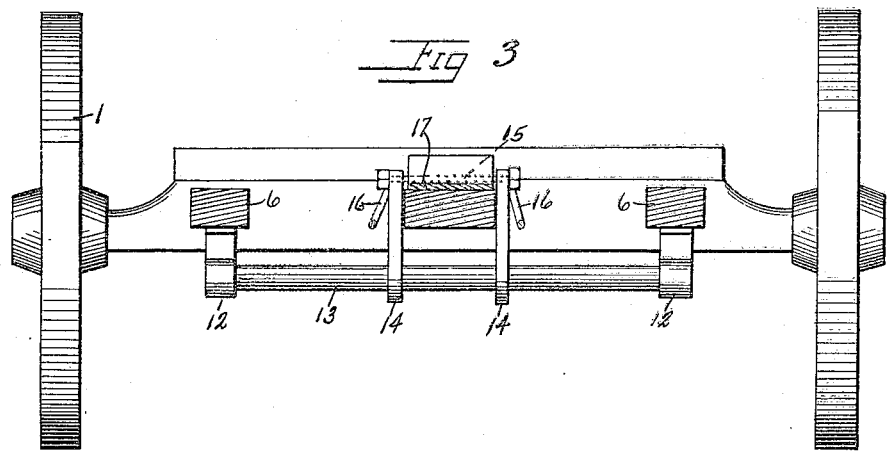
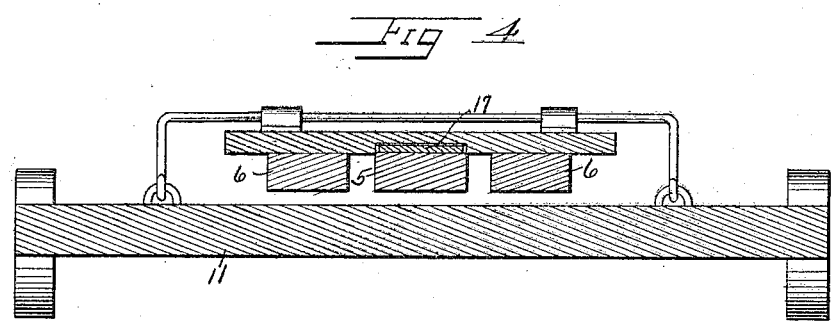
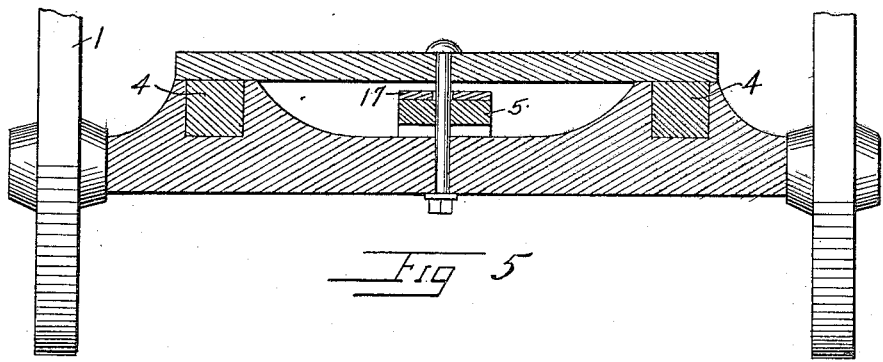

UNITED STATES PATENT OFFICE.

WILLIAM Z. WILLIS, OF BEAR CREEK, ALABAMA.

AUTOMATIC WAGON-BRAKE.

1,224,587. Specification of Letters Patent. Patented May 1, 1917.

Application filed January 8, 1916. Serial No. 71,024.

*To all whom it may concern:*

Be it known that I, WILLIAM Z. WILLIS, a citizen of the United States, residing at Bear Creek, in the county of Marion and State of Alabama, have invented certain new and useful Improvements in Automatic Wagon-Brakes, of which the following is a specification.

This invention relates to improvements in automatic wagon brakes.

The object of my invention is to provide a wagon brake that will be automatically applied upon any backward pressure upon the wagon tongue, the extent of the brake action being regulated by the degree of backward pressure on the tongue. It is obvious that such a brake is a great relief upon draft animals as they are not obliged to hold back the wagon on slight grades where the driver ordinarily would not think to apply a hand- or foot-brake.

Furthermore, my device is extremely simple in construction, in that it has comparatively few working parts, any of which may be replaced at a small cost.

Other objects of this invention not at this time more particularly enumerated, will be clearly understood from the detailed description and drawings forming a part of this specification.

Furthermore, this invention consists in the novel arrangement and combination of parts more particularly described in the following specification and embodied in the claims appended hereunto and forming a part of this application.

Referring now to the drawings, which are merely illustrative of my invention,

Figure 1 is a top plan view of a wagon with the body removed, with my brake mechanism applied thereto.

Fig. 2 is a longitudinal sectional view of the same taken on the line 2—2 of Fig. 1, with the body attached.

Fig. 3 is a transverse sectional view taken on the line 3—3 of Fig. 1.

Fig. 4 is a similar view taken on the line 4—4 of Fig. 1.

Fig. 5 is a similar view taken on the line 5—5 of Fig. 1.

Fig. 6 is a detail enlarged sectional view of means for rendering the brake inoperative at times.

Referring further to the drawings, wherein similar reference characters indicate similar parts throughout the respective view, 1 designates the wheels, 2 the pole, 3 the body, 4 the fore hound, 5 the reach, and 6 the hind hound of a conventional type of wagon.

The pole 2 is formed with a slot 8 transversely therethrough, and slidably mounted in the front portion of the fore hound 4, a pin 9 being inserted through said slot and fixed at both ends thereof to the fore hound, providing means for supporting the pole 2 and reducing the strain on the connecting rod 17. An arc-shaped slotted member 10 is secured upon the rearward portion of said block 7.

A conventional type of brake beam and shoes 11 are mounted upon the reach 5, near the rear end thereof. Bearings 12 are mounted on the under side of both arms of the hind hound near the rearward end thereof, and a shaft 13 is loosely mounted at both ends thereof in said bearings. Said shaft is provided with upright lever arms 14 centrally thereof. Said levers are placed adjacent both sides of said reach 5, and a pin 15 being interposed between them near the upper ends thereof and above the top of said reach. A rod 16 is interposed between each of said arms and said brake beam. A connecting rod 17 is connected at one end thereof to said pin 15, and at the other end is slidably engaged with the arc-shaped slotted member 10.

It is obvious from the construction as described, that any backward pressure on the pole 2 will move it to the rear, thus pushing back the connecting rod 17, which will operate to turn the shaft 13 within its bearings. Thus the lever arms 14 will be moved backwardly, exerting a pull upon the rods 16 and pulling the brake shoes into engagement with the wheels 1.

In order to render the device inoperative when desired to back the vehicle, I provide a pin 19 mounted in a bearing 20 carried on the pole or shaft 2, and maintained in inoperative position by a coiled spring 21. The pin 19 operates in an opening 22 having grooves 23 along the inner periphery thereof with which engage lugs 24 on the pin preventing rotation of the latter.

The utility, adaptability, and advantages of my improved form of automatic wagon brake being obvious, it is unnecessary to further enlarge upon the same herein.

What I claim as my invention and desire to secure by Letters Patent is:

1. The combination with the front and rear hounds, the pole, the reach, and brake of a vehicle, of a plurality of bearings mounted on the under side of both arms of the rear hound, a shaft loosely mounted in the said bearings, a pin, lever arms mounted on the shaft and connected to the said pin, an arch shaped slotted member, a connecting rod having one end slidably engaged in the said arch-shaped member, the other end thereof being connected to the said pin, a plurality of rods connecting one end of the lever arm and the brake beam providing means for operating the brake upon any backward pressure on the pole, and means mounted upon the pole to prevent the automatic operation of the said brake.

2. The combination of the front and rear hound, the pole, reach, and brake of a vehicle, of a brake operating means, an arch-shaped slotted member mounted on the rear end of the said pole, a rod connecting the said brake operating means and the arch-shaped slotted member, the said pole being provided with a transverse and vertical slot therein, a pin connecting the front ends of the front hound and extending through the said transverse slot, a bearing supported by the front hound, a pin slidably mounted in said bearing and vertical slot, a spring member normally retaining the said pin out of engagement with the said vertical slot, and means for slidably engaging the said pin in the slot for a purpose specified.

In testimony whereof, I affix my signature hereto.

WILLIAM Z. WILLIS.

Copies of this patent may be obtained for five cents each, by addressing the "Commissioner of Patents, Washington, D. C."